ized Patent [19]

Blount

[11] 4,100,112

[45] Jul. 11, 1978

[54] PROCESS FOR THE PRODUCTION OF AMINE SILICATE COMPOUNDS AND THEIR RESINOUS CONDENSATION PRODUCTS

[76] Inventor: David H. Blount, 5450 Lea St., San Diego, Calif. 92105

[21] Appl. No.: 798,329

[22] Filed: May 19, 1977

Related U.S. Application Data

[63] Continuation-in-part of Ser. No. 652,338, Jan. 26, 1976, which is a continuation-in-part of Ser. No. 559,313, Mar. 17, 1975, Pat. No. 3,979,362, which is a continuation-in-part of Ser. No. 262,485, Jun. 14, 1972, abandoned, which is a continuation-in-part of Ser. No. 71,628, Sep. 11, 1970, abandoned.

[51] Int. Cl.² .................................................. C08G 77/04

[52] U.S. Cl. .................... 260/185; 260/18 R; 260/18 EP; 521/154; 260/21; 260/824 EP; 260/826; 260/448.2 N; 528/105; 528/116; 528/119; 528/121; 528/232; 528/246; 528/266; 528/336; 528/337; 528/341; 528/342; 528/343; 528/344; 528/345; 528/347; 528/332; 528/387; 528/418; 528/421; 528/393

[58] Field of Search ................. 260/2 S, 2 EP, 2 EC, 260/18 R, 18 EP, 21, 2.5 EP, 2.5 S, 67.6 R, 68, 69 F, 72 R, 824 EP, 826, 78 R, 78.41, 79, 448.2 N

[56] References Cited

U.S. PATENT DOCUMENTS

| | | | |
|---|---|---|---|
| 3,979,362 | 9/1976 | Blount | 260/67.6 R |
| 4,033,935 | 7/1977 | Blount | 260/67.6 R |
| 4,036,787 | 7/1977 | Blount | 260/2 S |

*Primary Examiner*—Melvyn I. Marquis

[57] ABSTRACT

Amine silicate compounds are formed by the chemical reaction of hydrated silica with an amine compound in the presence of a suitable alkali catalyst at a suitably elevated temperature, and then by reacting the resultant compounds with aldehydes, epoxys, organic dicarboxylic anhydrides, polycarboxylic acid compounds or carbon disulfide, thereby forming a resinous condensation product.

17 Claims, No Drawings

PROCESS FOR THE PRODUCTION OF AMINE SILICATE COMPOUNDS AND THEIR RESINOUS CONDENSATION PRODUCTS

CROSS-REFERENCE TO RELATED APPLICATIONS

This application is a continuation-in-part of my co-pending Application, Ser. No. 652,338, filed on Jan. 26, 1976, which is a continuation-in-part of an earlier application, Ser. No. 559,313, filed Mar. 17, 1975, now U.S. Pat. No. 3,979,362, which is a continuation-in-part of an earlier application, Ser. No. 262,485, filed Jun. 14, 1972, now abandoned, which is a continuation-in-part of an earlier application, Ser. No. 71,628, filed Sep. 11, 1970, now abandoned.

BACKGROUND OF THE INVENTION

This invention relates in general to hydrated silica ($SiO_2 \cdot xH_2O$) and, more specifically, to a process for producing novel amine silicate compounds and their resinous condensation products.

The hydrated silica ($SiO_2 \cdot xH_2O$) may be produced by any of the well known processes, such as chemically reacting an aqueous solution of sodium metasilicate with a mineral acid to produce a silicic acid gel. The silicic acid gel is then air dried to produce white granules of hydrated silica. The hydrated silica may be produced by chemically reacting an alkaline earth metasilicate or an alkali metal metasilate with an acid compound. The hydrated silica is preferred to be in the form of small granules or in the form of a fine powder.

The amine silicate compounds are useful as intermediates for the production of other compounds by further suitable reactions. Typically, they may be used in the production of prepolymers, polymers, resinous condensation products or as an additive or a reactant. They may be reacted with aldehydes to produce resinous products. They may be used as a catalyst in the production of epoxy compounds. They may be chemically reacted with epoxy compounds to produce resinous condensation products. They may be chemically reacted with dicarboxylic anhydrides or polycarboxylic acid to produce silicic amide resinous condensation products. They may chemically be reacted with carbon disulfide to form resinous products. Also, they may be used in coating agents, adhesives, impregnants, molding powders, paints, varnishes, laminates, or their manufacture, and may be reacted with other polymerizing compounds.

The amide silicate resinous condensation products are useful as coating agents, adhesives, impregnants, molding powders, paints, varnishes, laminates or their manufacture, and may be reacted with other polymerizing compounds.

The amine silicate compound will react chemically with alkali metal hydroxide, alcohols, acetones, furans, isocyanates, carbon disulfide, diisocyanates, silicones, silicon tetrachlorides, organic halides organic acids and mixtures thereof, to form new and useful compounds.

SUMMARY OF THE INVENTION

The chemical reaction between hydrated silica and an amine may take place in a basic, neutral or acidic pH, but it is enhanced by a basic pH. The acidic catalysts most commonly used are sodium hydrogen sulfate, sulfuric acid, hydrochloric acid, formic acid, acetic acid, and acid esters, such as acid alkyl phosphates. The preferred basic catalyst is sodium carbonate, but other basic compounds may be used, such as calcium hydroxide, sodium hydroxide, ammonia and alkanolamine. The alkali may act as a catalyst directly, or it may react slightly with one of the other of the primary reactants. From about 1 to 10 weight percent catalyst, based on the weight of hydrated silica and amine compound used, gives best results.

The amine silicate condensation products produced by reacting the amine silicate with aldehydes, dicarboxylic anhydrides and polycarboxylic acids may be converted to a fully hardened state by prolonged heating. Plasticizers may be used to improve flexibility and adhesiveness. Latent catalysts may be used to catalyze the final conversion of the molding powder from the initial stages of resinous condensation product to the infusible, insoluble product.

I have discovered hydrated silica will react chemically with an amine to produce an amine silicated compound. The preferred method to react fine granular hydrated silica with an amine is to react them chemically in the presence of a suitable alkali catalyst in an aqueous solution, in the ratio of 1:1 mols, 1:2 mols or 2:1 mols by heating to a temperature just below the boiling temperature of the amine compound, while agitating at ambient pressure until the reaction is substantially complete.

While the specific reaction which takes place is not fully understood, typical reactions which are believed to occur take place as follows:

Metasilicic acid is theorized to react with an amine as follows:

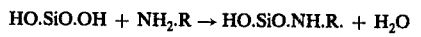

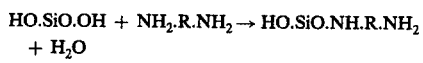

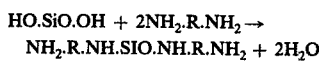

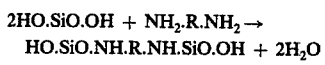

wherein R is an aliphatic radical.

In the chemical reaction of the amine with hydrated silica, there appears to be a mixture of products produced, such as amine silicate and diamine silicate, and when diamines or polyamines are used, amine disilicates and diamine silicates are produced. Not all of the hydrated silica will react with the amine compound. About 25% to 50% of the hydrated silica will not react chemically with amine compounds. The results may be improved, by chemically reacting the amine with the hydrated silica under pressure up to about 250 psi. The unreacted hydrated silica may be utilized as a filler but will also react with other organic compounds which are used to produce the resinous compounds of this invention.

DETAILED DESCRIPTION OF THE INVENTION

Any suitable amine compound may be used in my novel process. Typical amine compounds include ammonia methylamine, ethylamine, propylamine, isopropylamine, butylamine, amylamine, hexylamine aniline, toluidine amine, xylidine amine, phenylenediamine, naphthylamine, benzylamine, ethylenediamine, tetramethylenediamine, pentamethylenediamine, hexamethylenediamine, octamethylenediamine, decamethylenediamine, xylylenediamine, diphenylamine, piperazine and other compounds which contain an amine radical such as aminocaproic acid, alkylene polyamines, vinyl amines, diethylenetriamine, triethylenetetramine, tetraethylenepentamine, nervine, caprolactam, aminoacetaldehyde diethyl acetal, aminoacetic acid, aminobenzoic acid, 2-amino-1-butanol, 2-aminoethanol, 1-amino-2-propanol, O-aminophenol, p-aminophenol, 1-amine-2-propanol, 6-amino-2-picoline, 2-amino-4-nitrophenol, aminosuccinic acid (DL Aspartic acid), 2-aminopyridine, and mixtures thereof.

The amine silicate compounds will react chemically with an epoxy compound to produce an epoxy silicate resinous product. The epoxy silicate resinous product may range from a liquid to a solid product which may be produced as a very hard, soft or a rubbery product. The amine silicate may act as a catalyst to produce epoxy resins. The reactants may be mixed in any suitable proportions, depending upon the product characteristics desired. Generally, from about 0.1 to about 3 mols of the epoxy compound are mixed with each mol of the amine silicate compound.

In the preferred embodiment of this invention to produce epoxy silicate resinous products, a thermoplastic resinous product, having excellent properties is produced by mixing the epoxy compound with the amine compound in steps of about 10 to 20 percent of the total, allowing the reaction to be completed for each step before additional epoxy compound is added. Generally, with agitation, only a few minutes need be allowed between additional steps.

Any suitable epoxy compound may be used in this process. Typical epoxy compounds include epichlorohydrin, glycidol, methyl epichlorohydrin, 1,2-epoxy-3-phenoxypropane, 3,4-epoxyethyl benzene, 1,2-epoxybutane, 1,2-epoxycylohexane, epoxyethane, 1,2-epoxypropane, 1-chloro-2,3-epoxypropane, 1:2, 3:4-diepoxybutane, 2:3,6:7-diepoxy-2, 6-dimethyl-4-octene, epoxyethylbenzene, and mixtures thereof.

Any suitable epoxides of polyhydroxy compounds, unsaturated organic compounds, unsaturated fatty acids and vegetables oils may be used in this process. These epoxides of polyhydroxy compounds and vegetable oils are produced by chemically reacting a peroxy acid such as peroxyacetic acid, peroxybenzoic acid and peroxy acids with polyhydroxy compounds and vegetable oils containing hydroxyl groups and unsaturated groups. The peroxy acids are produced by oxidizing organic aldehydes.

Best results are obtained when the epoxidized unsaturated organic compounds, epoxidized polyhydroxy compounds, epoxidized vegetable oils are used with epichlorohydrin in the production of epoxy silicate resinous products and foams. The ratio of the parts by weight of epoxidized compounds to the parts by weight of epichlorohydrin may be quite varied, ranging from 2 to 1 up to 1 to 2.

In the production of amine silicate compounds to be used in this invention to produce epoxysilicate compounds, aliphatic and aromatic amine silicates have been found to be most useful. Primary amine silicates are more effective than secondary and tertiary amine silicates and are, therefore, preferred. Optimum results have been obtained with polyfunctional aliphatic amine silicates such as diethylenetriamine silicate, since the reaction takes place rapidly at room temperature to form apparently highly cross-linked structures. If desired, complex or adduct amine silicates may be used.

Any suitable modifying or additive compounds may be used in the reaction to produce epoxy silicate resinous products to vary properties of the product. Typical additives include dicarboxylic anhydrides, di and polyhydroxy compounds, polysulfide polymers, alkali sulfides, sodium polysulfide, aminoplasts, phenoplasts, fatty or rosin acids, furfural-ketone resins, dibutyl phthalate, tricresyl phosphate, styrene oxides, acetonitrile, primary aromatic sulfonamides, secondary aromatic sulfonamides, carbon disulfide, soya bean oil, polyamide resins, aldehydes, and dicarboxylic acids.

The reactions of this invention may take place under any suitable physical condition. While many of the reactions will take place acceptably at ambient temperature and pressures, in some cases, better results may be obtained at somewhat elevated temperatures and pressures. Preferably, the reaction takes place at a temperature between 50° C and the boiling temperature of the solution. On the other hand, where the reaction is exothermic, it may be desirable to cool the reaction vessel. With some products it is desirable to raise the pH after the reaction is complete to at least about 7 to precipitate the resinous product.

The exact course of the reactions which take place during the process to produce epoxy silicate resins and foams cannot be determined with 100% certainty. The exact chemical formulae for the epoxy silicate resinous product and foams are not known.

The diamine and polyamine silicate compounds will react chemically with aldehyde compounds to produce poly(aldehyde amino silicate) resinous products and will be named amino silicate resinous products for the purpose of this invention.

Various aldehydes may be used such as formaldehyde, acetaldehyde, paraformaldehyde, butyaldehyde, chloral, acrolein and furfural. The aldehyde ratio may vary from 1:1 to 5:1 when reacting with an amine silicate, depending on the methyl groups desired. The chemical reaction between aldehydes and polyamine silicate compounds may take place in a basic, neutral, or acidic pH, but it is enhanced by a basic pH. The acidic catalysts most commonly used are sodium hydrogen sulfate, sulfuric acid, hydrochloric acid, formic acid, acetic acid, and acid esters, such as acid alkyl phosphates. The most common basic catalyst is sodium carbonate, but other basic compounds may be used, such as calcium hydroxide, sodium hydroxide, potassium hydroxide, ammonia and alkanolamine. The alkali may act as a catalyst directly, or it may react slightly with one or the other of the primary reactants. From about 1 to 10 weight percent of alkali catalyst, based on the weight of amine silicate compound and aldehyde, gives best results. The resinous solution of poly(aldehyde amine silicate) may be converted to a fully hardened state by prolonged heating. Plasticizers may be used to improve flexibility and adhesiveness. Latent catalysts may be used to catalyze the final conversion of the molding powder from the initial stages of resin formation to infusible, unsoluble products.

The chemical reaction to produce poly(aldehyde amine silicate) resinous products may take place under any suitable temperature or pressure. The reaction may take place at ambient temperature and pressure, but in certain circumstances, the temperature may be elevated to just below the boiling temperature of the aldehyde, and the pressure may be reduced to produce a vacuum to remove the water produced in the reaction.

The diamine and polyamine silicate compounds will react chemically with dicarboxylic or polycarboxylic acids to produce silicic amide resinous condensation products.

Various dicarboxylic and polycarboxylic acids may be used, such as terephthalic, oxalic, malonic, gluteric, pimelic, succinic, phthalic, maleic, fumaric, adipic, azelaic, sebacic, isophthalic, itaconic and vegetable oils containing polycarboxylic acids.

The reactions in the production of silicic amide, resinous products may take place under any suitable physical condition. While many of the reactions will take place acceptably at ambient temperature and pressures, in most cases, better results may be obtained at somewhat elevated temperatures and pressures. Preferably the reaction takes place at a temperature below the boiling temperature of the amine, then as the amine silicate compound partially reacts with the dicarboxylic or polycarboxylic acid, the temperature may be gradually elevated up to 280° C. The pressure may range from ambient pressure to 250 psi. A vacuum evaporator may be used to remove the water produced in the reaction. The reaction may take place in an aqueous solution. The solution is heated to evaporate most of the water and produces a silicic amide salt, then the reaction is completed by elevating the temperature until the reaction is substantially complete. The latter stage of heating may take place under an inert atmosphere such as nitrogen, thereby producing less discoloration. The chemical reaction may take place in a basic, neutral or acidic pH, but is enhanced by a basic or an acidic pH. The acidic catalyst may be a hydrogen containing acid salt, a mineral acid, an organic acid or an acid ester. The basic catalyst may be an alkali metal hydroxide, carbonate or oxide; it may also be an alkaline earth metal hydroxide, carbonate, or oxide and basic organic compounds such as ammonia and salts of weak acids.

Various acid catalysts may be used in the chemical reaction to produce poly(silicic amide) resinous products such as sodium hydrogen sulfate, potassium hydrogen sulfate, sodium hydrogen phosphate, sulfuric acid, hydrochloric acid, phosphoric acid, acetic acid, formic acid, tartaric acid, oxalic acid, aromatic sulfonic acid, acid alkyl phosphates and mixtures thereof.

Various basic catalysts may be used in the chemical reaction to produce poly(silicic amide) resinous products such as sodium carbonate, potassium carbonate, calcium hydroxide, sodium hydroxide, potassium hydroxide, alkanolamine, ammonium hydroxide, sodium oxalate, sodium silicate, tetraalkylammonium hydroxide and mixtures thereof.

The amide silicate resinous products may be melted and molded into tough, strong, useful products. The amide silicate resinous products may also be chemically reacted with epoxy compounds to produce useful objects and protective coatings for wood.

The amine silicate compound produced by the chemical reaction of a aldehydes or polyamine compound with hydrated silica will react chemically with carbon disulfide to produce amine disulfide silicate resinous products. These amine disulfide silicate resinous products may be used in the production of varnish, and they will react chemically with epoxy compounds to produce hard, tough, useful products and protective coatings for wood.

The amine disulfide silicate resinous product is produced by mixing an amine silicate with carbon disulfide in the ratio of about 1:1 mols to 3:2 mols at ambient pressure and temperature. The amine disulfide silicate will react with an epoxy compound in the ratio of about 1:1 mols to produce liquid polymer which may be heated in a mold to about 80° C and produces hard, tough, useful objects.

DESCRIPTION OF PREFERRED EMBODIMENTS

The following examples describe in detail certain preferred embodiments of the process of my invention. These preferred processes may, of course be varied as described above with similar results. Parts and percentages are by weight, unless otherwise indicated.

EXAMPLE I

About one mol of hydrated silicate ($SiO.xH_2O$), about 1.5 mols of ammonium hydroxide in an aqueous solution and about 0.1 mol of sodium carbonate are mixed, then heated to about 90° C while agitating at ambient pressure until the water evaporates, thereby producing white granules of ammonium silicate.

About one mol of said ammonium silicate and about 2 mols of formaldehyde in an aqueous solution are heated to 80° to 100° C for 30 to 60 minutes, thereby producing a white amino silicate resinous product.

EXAMPLE II

About 20 parts by weight of fine granular hydrated silica, 40 parts by weight of para-aminobenzoic acid, 2 parts by weight of potassium carbonate and 30 parts by weight of water are mixed then heated to above the melting temperature and below the boiling temperature of para-aminobenzoic acid (100° to 150° C) while agitating for 30 to 90 minutes, thereby evaporating the water at ambient pressure and producing aminobenzoic silicate a brown, hard, brittle compound.

On reheating the aminobenzoic silicate compound between 100° to 150° C, it will not melt and is thermoplastic. The aminobenzoic silicate is soluble in acetic acid, and in solution the color changes to black. The solution is filtered and 40% to 50% of the hydrated silica is filtered out, unreacted.

EXAMPLE III

About 20 parts by weight of fine granular hydrated silica, 30 parts by weight of aniline, 2 parts by weight of sodium carbonate and 50 parts by weight of water are mixed, then heated to 100° to 150° C while agitating for 30 to 90 minutes, evaporating the water, thereby producing aniline silicate, a brown granular compound.

About 20 parts by weight of the aniline silicate and about 60 parts by weight of an aqueous 37% formaldehyde solution are mixed; sulfuric acid is added until the pH is 5 to 6. The mixture is heated to 80° to 100° C for 30 to 60 minutes, thereby producing a brown, resinous amino silicate product.

EXAMPLE IV

About 20 parts by weight of fine granular hydrated silica, 30 parts by weight of ethylenediamine, 5 parts by weight of sodium carbonate and 50 parts by weight of water are mixed then heated to 80° to 150° C while agitating to evaporate the water; heating is continued for 30 to 60 minutes, thereby producing light yellow granules of ethylene diamine silicate.

About 20 parts by weight of the light yellow granules of ethylenediamine silicate are mixed with about 50 parts by weight of an aqueous solution containing 37% formaldehyde; the mixture is heated to 80° to 100° C for 30 to 60 minutes, thereby producing a yellow amino silicate resinous product. It is soluble in water, and on filtering, about 40% of the hydrated silica is filtered out unreacted.

About 20 parts by weight of the light yellow granules of ethylenediamine silicate are placed in a container, then about 20 parts by weight of epichlorohydrin are divided in portions of about 3 to 4 parts by weight then added while agitating and keeping the temperature between 30° to 70° C for about 10 minutes until the reaction is complete before adding another portion of epichlorohydrin, thereby producing a light gray, thick liquid epoxy silicate resinous product. The epoxy silicate resinous product is then poured into a mold and heated to about 80° C while agitating until the epoxy silicate resinous product begins to expand, thereby producing an epoxy silicate foam. The foam is heated to 100° to 150° C for 1 to 2 hours, thereby producing a tan semi-rigid, self-standing, epoxy silicate foam.

EXAMPLE V

About 20 parts by weight of hydrated silica (fine granular), about 40 parts by weight of ethylenediamine, about 2 parts by weight of sodium carbonate and about 50 parts by weight of water are mixed then heated to 80° to 100° C while agitating for 30 to 60 minutes, evaporating the water and thereby producing a yellowish brown, thick liquid and granules of diethylenediamine silicate and ethylenediamine silicate.

About 20 parts by weight of the diethylenediamine silicate and ethylenediamine mixture are slowly mixed with about 10 parts by weight of carbon disulfide at ambient temperature and pressure, thereby producing a yellow amine disulfide silicate resinous product.

EXAMPLE VI

About 20 parts by weight of fine granular hydrated silica, 30 parts by weight of 1,6-hexanediamine, about 4 parts by weight of sodium carbonate and about 100 parts by weight of water are mixed, then heated to 80° to 150° C while agitating under ambient pressure until most of the water is evaporated; heating is continued for 30 to 60 minutes under a vacuum to remove the water, thereby producing light gray granules of hexanediamine silicate.

About 30 parts by weight of the 1,6-hexanediamine silicate, about 20 parts by weight of adipic acid and about 100 parts by weight of water are mixed. Dilute hydrochloric acid is added to the mixture until the pH is 5 to 6, then the mixture is heated to 80° to 150° C while agitating at ambient pressure for 30 to 60 minutes until most of the water is evaporated. The heating is continued at 150° to 250° C for 30 to 60 minutes, thereby producing a light green colored silicic amide resinous product.

About 20 parts by weight of 1,6-hexanediamine silicate and 10 parts by weight of epichlorohydrin are mixed then heated to 30° to 70° C while agitating for 20 to 40 minutes, thereby producing a light brown liquid polymer, polyepoxy silicate. The said polymer is thermoplastic, and when heated to about 80° C, it becomes a light brown, rubbery polymer.

About 20 parts by weight of said 1,6-hexanediamine silicate and about 20 parts by weight of a 37% aqueous solution of formaldehyde are mixed then heated to 80° to 100° C while agitating at ambient pressure for 30 to 60 minutes, thereby producing an amino silicate resinous product.

EXAMPLE VII

About 20 parts by weight of fine granular hydrated silica, 40 parts by weight of hexanediamine and about 100 parts by weight of water are mixed then heated to 80° to 150° C while agitating under ambient pressure until the water is evaporated and the temperature is elevated to about 150° C for 30 to 60 minutes, thereby producing light gray granules of hexanediamine silicate.

About 30 parts by weight of the hexanediamine silicate, about 15 parts by weight of maleic acid and about 100 parts by weight of water are mixed, then the mixture is heated to 80° to 150° C while agitating at ambient pressure for 30 to 60 minutes until most of the water evaporates; the heating is continued at 150° to 250° C for 30 to 60 minutes, thereby producing a light gray silicic amide resinous product.

About 20 parts by weight of said hexanediamine silicate and about 15 parts by weight of furfural are mixed, then an acid catalyst, dilute hydrochloric acid is added until the pH is about 5 to 6 while agitating, thereby producing an amino silicate resinous product.

EXAMPLE VIII

About 20 parts by weight of fine granular hydrated silica, 40 parts by weight of triethylenetetramine and about 100 parts by weight of water are mixed, then heated to 80° to 150° C while agitating under ambient pressure until the water is evaporated and the temperature is elevated to about 150° C for 30 to 60 minutes, thereby producing light gray granules of triethylenetetramine silicate.

About 20 parts by weight of said triethylenetetramine silicate, about 10 parts by weight of oxalic acid and about 100 parts by weight of water are mixed then heated to 80° to 150° C while agitating at ambient pressure until the water is evaporated. The heating is continued at 150° to 250° C for 30 to 60 minutes; thereby producing a light yellow silicic amide resinous product.

About 20 parts by weight of said triethylenetetramine silicate and about 20 parts by weight of a 37% formaldehyde aqueous solution are mixed then heated to 80° to 100° C for 30 to 60 minutes, thereby producing an amino silicate resinous product.

About 20 parts by weight of said triethylenetetramine silicate and 10 parts by weight of carbon disulfide are gradually mixed, thereby producing an amino disulfide silicate resinous product.

EXAMPLE IX

Amine silicate compounds are produced by the following steps:

(a) mixing 20 parts by weight of fine granular hydrated silica and about 50 parts by weight of water;

(b) adding sodium carbonate to the mixture until the pH is 8 to 10;

(c) adding 30 parts by weight of ethylenediamine to the mixture;

(d) heating the mixture to 80° to 150° C while agitating until the water evaporates; any evaporated ethylenediamine is replaced; the heating is continued at about 80° to 150° C for 30 to 60 minutes, thereby (e) producing light yellow granules of ethylenediamine silicate compounds.

About 50% of the ethylenediamine silicate is soluble in water; the remaining 50% is not. About 2 parts by weight of the proportion not soluble in water is reacted chemically with epichlorohydrin to produce an epoxy silicate resinous product by the following steps:

(1) mixing epichlorohydrin in proportions of 5 parts by weight until 30 parts by weight are used with 20 parts by weight of said ethylenediamine silicate (proportion not soluble in water) while agitating and keeping the temperature between 30° to 70° C, thereby (2) producing a thick, light yellow liquid polymer epoxy silicate;

(3) heating the said epoxy silicate polymer to a temperature between 80° to 100° C, thereby (4) producing a solid epoxy silicate resinous product.

About 20 parts by weight of said ethylenediamine silicate compounds are slowly mixed with about 20 parts by weight of carbon disulfide, thereby producing a yellow resinous product.

About 20 parts by weight of said ethylenediamine silicate, about 10 parts by weight of paraformaldehyde and about 20 parts by weight of water are mixed then heated to a temperature of 80° to 150° C until the water evaporates, then heating is continued for 30 to 60 minutes, thereby producing an amino silicate resinous product.

About 20 parts by weight of said ethylenediamine silicate and about 15 parts by weight of carbon disulfide are mixed by slowly adding the carbon disulfide to the ethylenediamine while agitating at ambient temperature and pressure over 10 to 30 minutes, thereby producing amine disulfide silicate resinous product.

EXAMPLE X

Amine silicate compounds are produced by the following steps:

(a) mixing 20 parts by weight of hydrated silica, 30 parts by weight of diethylenetriamine, about 50 cc of water and 4 parts by weight of sodium hydroxide;

(b) heating the mixture to 80° to 150° C while agitating until the water evaporates; the evaporated diethylenetriamine is replaced, then continue heating at 80° to 150° C for 30 to 60 minutes, thereby (c) producing light yellow granular diethylenetriamine silicate compounds.

About 20 parts by weight of the said diethylenetrianime silicate compounds are mixed with about 20 parts by weight acrolein, then heated to 80° to 100° C for 30 to 60 minutes while agitating, thereby producing an amino silicate resinous product.

About 20 parts by weight of said diethylenetriamine silicate compounds, 30 parts by weight of linoleic acid, and about 50 parts by weight of water are mixed then heated to 80° to 150° C while agitating until the water evaporates. The heating is continued at 150° to 250° C for 30 to 60 minutes, thereby producing a light yellow silicic amide resinous product.

About 20 parts by weight of said diethylenetriamine silicate compounds and about 15 parts by weight of carbon disulfide are mixed, thereby producing a yellow amine disulfide silicate resinous product. The amine disulfide silicate resinous product has a softening point of about 50° C and a melting point varying from 80° to 100° C. A proportion of the amine disulfide silicate resinous product is soluble in water and dilute sodium hydroxide aqueous solutions.

EXAMPLE XI

About 20 parts by weight of fine granular hydrated silica, 40 parts by weight of diethylenetriamine and about 6 parts by weight of sodium carbonate are mixed in a closed system, then heated to 80° to 150° C while agitating under ambient pressure for 30 to 60 minutes, thereby producing light yellow, granular amine silicate compounds.

About 20 parts by weight of said diethylenetriamine silicate compounds and 20 parts by weight of acetaldehyde are mixed, then heated to 80° to 150° C for 30 to 60 minutes, in a closed system, while agitating, thereby producing an amino resinous product.

About 20 parts by weight of said diethylenetriamine silicate compounds, 15 parts by weight of epichlorohydrin and 15 parts by weight of epoxidized castor oil are mixed by slowly adding the epichlorohydrin and epoxidized castor oil to the diethylenetriamine silicate compound while agitating for 30 to 60 minutes, keeping the temperature between 30° to 70° C, thereby producing an epoxy silicate resinous product.

About 20 parts by weight of said diethylenetriamine silicate compounds and 40 parts by weight of phthalic acid are mixed, then heated 80° to 250° C while agitating in a closed system for 30 to 60 minutes, thereby producing a silicic amide resinous product.

EXAMPLE XII

About 20 parts by weight of a fine granular hydrated silica, 40 parts by weight of caprolactam, 4 parts by weight of sodium carbonate and 100 parts by weight of water are mixed then heated to 80° to 150° C until the water evaporates, and the heating is continued at 80° to 150° C for 30 to 60 minutes while agitating at ambient pressure, thereby producing white caprolactam silicate compounds.

EXAMPLE XIII

About 20 parts by weight of the diethylenetriamine silicate as produced in Example X, about 15 parts by weight of epichlorohydrin and 15 parts by weight of an epoxize of castor oil, containing at least two epoxide radicals per mol of castor oil, are mixed then agitated, keeping the temperature between 30° to 70° C for about 5 to 10 minutes. The temperature is then increased to 80° to 100° C, thereby producing a solid epoxy silicate resinous product.

EXAMPLE XIV

About 20 parts by weight of the diethylenetriamine silicate as produced in Example X, about 15 parts by weight of an epoxize of unsaturated fatty acid, containing at least two epoxide radicals per mol of unsaturated fatty acid, about 15 parts by weight of epichlorohydrin are mixed then agitated at ambient temperature and pressure, thereby producing a solid epoxy silicate resinous product.

EXAMPLE XV

About 20 parts by weight of the diethylenetriamine silicate as produced in Example XI, about 15 parts by weight of epichlorohydrin and about 15 parts by weight of epichlorohydrin bisphenol A epoxy resin, containing at least 2 or more reactive epoxy groups per molecule are mixed then agitated at ambient temperature and pressure thereby producing a solid epoxy silicate resin.

EXAMPLE XVI

About 20 parts by weight of fine granular hydrated silica, about 20 parts by weight of propylamine are mixed, then heated to about 45° C while agitating in a closed system at ambient pressure for about 30 to 90 minutes, thereby producing propylamine silicate.

Although specific conditions and ingredients have been described in conjunction with the above Examples of preferred embodiments, these may be varied, and other reagents and additives may be used, where suitable, as described above, with similar results.

Other modifications and applications of this invention will occur to those skilled in the art upon reading this disclosure. These are intended to be included within the scope of this invention, as defined in the appended claims.

I claim:

1. The process for the production of amine silicate compounds by the following steps:
    (a) mixing about 20 parts by weight of a fine granular hydrated silica, 20 to 40 parts by weight of an amine compound, selected from the group consisting of ammonium hydroxide, methylamine, ethylamine, propylamine, isopropylamine, butylamine, amylamine, hexylamine, aniline, toluidine amine, xylidine amine, naphthylamine, benzylamine, phenylenediamine, ethylenediamine, tetramethylenediamine, pentamethylenediamine, decamethylenediamine, xylylenediamine, piperazine, diethylenetriamine, triethylenetetramine tetraethylenepentamine, tolylene diamine, aminocaproic acid, caprolactam, aminoacetic acid, aminobenzoic acid, aminosuccinic acid, 2-aminopyridine, 2-amino-1-butanol, 2-aminoethanol, 1-amino-2-propanol, o-aminophenol, p-aminophenol, 6-amino-2-picoline, 2-amino-4-nitrophenol, and mixtures thereof, and 50 to 100 parts by weight of water;
    (b) adding an alkali catalyst in the proportion of 1% to 10% by weight, weight based on the weight of hydrated silica and the amine compound;
    (c) heating said mixture to 80° to 150° C while agitating until most of the water is evaporated, replacing any evaporated amine, then heating is continued at 80° to 150° C for 30 to 60 minutes, thereby
    (d) producing amine silicate compounds.

2. The process of claim 1 wherein the amine compound is selected from the group consisting of ammonium hydroxide, methylamine, ethylamine, propylamine, isopropylamine, butylamine, amylamine, hexylamine, aniline, toluidine amine, xylidine amine, naphthylamine, benzylamine, and mixtures thereof.

3. The process of claim 1 wherein the amine compound is selected from the group consisting of aminocaproic acid, caprolactam, aminoacetic acid, aminobenzoic acid, aminosuccinic acid (DL Aspartic acid), 2-aminopyridine, and mixtures thereof.

4. The process of claim 1 wherein the amine compound is selected from the group consisting of 2-amine-1-butanol, 2-aminoethanol, 1-amino-2-propanol, o-aminophenol, p-aminophenol, 1-amino-2-propanol, 6-amino-2-picoline, 2-amino-4-nitrophenol, and mixtures thereof.

5. The method of claim 1 wherein the alkali catalyst is an alkali carbonate selected from the group consisting of sodium carbonate and potassium carbonate.

6. The method of claim 1 wherein the alkali catalyst is an alkali hydroxide selected from the group consisting of sodium hydroxide and potassium hydroxide.

7. The product produced by the method of claim 1.

8. The process of claim 1 wherein additional steps are added following step (d) to produce epoxy silicate resinous products by the following steps:
    (e) mixing slowly 10 to 40 parts by weight of an epoxy compound selected from the group consisting of epichlorohydrin, glycidol, methyl epichlorohydrin, 1,2-epoxy-3-phenoxypropane, 3,4-epoxyethyl benzene, 1,2-epoxybutane, 1,2-epoxycyclohexane, epoxyethane, 1,2-epoxypropane, 1-chloro-2,3-epoxypropane, 1:2,3:4-diepoxybutane, 2:3,6:7-diepoxy-2,6-dimethyl-4-octene, epoxyethylbenzene, epichlorohydrin bisphenol A epoxy resin containing 2 or more reactive epoxy groups per molecule, epichlorohydrin diglycidyl ether of bisphenol epoxy resin containing 2 or more reactive epoxy groups per molecule, epichlorohydrin resorcinol epoxy resin containing 2 or more reactive epoxy groups per molecule and mixtures thereof, with about 20 parts by weight of the amine silicate compound as produced by the methods of claim 1;
    (f) agitating the said mixture while keeping the temperature between 30° to 70° C at ambient pressure, thereby
    (g) producing an epoxy silicate polymer;
    (h) heating said epoxy silicate polymer to a temperature between 80° to 100° C, thereby
    (i) producing an epoxy silicate resinous product.

9. The product produced by the method of claim 8.

10. The process of claim 1 wherein the amine compound is selected from the group consisting of phenylenediamine, ethylenediamine, tetramethylenediamine, pentamethylenediamine, decamethylenediamine, xylylenediamine, piperazine, diethylenetriamine, triethylenetetramine tetraethylenepentamine, tolylene diamine and mixtures thereof.

11. The process of claim 10 wherein additional steps are added following step (d) to produce silicic amide resinous products by the following steps:
    (e) mixing about 20 parts by weight of the amine silicate compound as produced by claim 3, 20 to 40 parts by weight of a dicarboxylic organic acid selected from the group consisting of oxalic acid, malonic acid, glutaric acid, pimelic acid, succinic acid, phthalic acid, terephthalic acid, maleic acid, fumaric acid, adipic acid, azelaic acid, sebacic acid, isophalic acid, itaconic acid, vegetable oils containing polycarboxylic acids, and mixtures thereof, and 50 to 100 parts by weight of water;
    (f) heating said mixtures 80° to 150° C while agitating until most of the water is evaporated then heating said mixture to 150° to 250° C while agitating under ambient pressure to 250 psi of pressure for 30 to 90 minutes, thereby
    (g) producing an amide silicate resinous product.

12. The process of claim 10 wherein additional steps are added following step (d) to produce amine disulfide silicate resinous products by the following steps;
    (e) adding slowly while agitating about 10 to 15 parts by weight of carbon disulfide to about 20 parts by weight of the amine silicate produced by the process of claim 3, at ambient temperature and pressure over a period of 10 to 30 minutes, thereby
    (f) producing an amine disulfide silicate resinous product.

13. The method of claim 10 wherein additional steps are added following step (d) to produce amino resinous products by the following steps:
  (e) mixing 20 parts by weight of the amine silicate produced by the process in claim 3 with 20 to 60 parts by weight of an aldehyde selected from the group consisting of an aqueous solution of formaldehyde, paraformaldehyde, acetaldehyde, butyaldehyde, chloral, acrolein, furfural and mixtures thereof;
  (f) heating said mixture to 80° to 150° C while agitating at ambient pressure for 30 to 60 minutes, thereby
  (g) producing an amino silicate resinous product.

14. The process of claim 13 wherein in step (e) an acid catalyst selected from the group consisting of sodium hydrogen sulfate, sulfuric acid, hydrochloric acid, formic acid, 15. The product produced by the method of claim 13.

16. The process for the production of amine silicate compounds by the following steps:
  (a) mixing about 20 parts by weight of a fine granular hydrated silica, 20 to 40 parts by weight of an amine compound, selected from the group consisting of ammonium hydroxide, methylamine, ethylamine, propylamine, isopropylamine, butylamine, amylamine, hexylamine, aniline, toluidine amine, xylidine amine, naphthylamine, benzylamine, phenylenediamine, ethylenediamine, tetramethylenediamine, pentamethylenediamine, decamethylenediamine, xylenediamine, piperazine, diethylenetriamine, tetraethylenepentamine, tolylene diamine, aminocaproic acid, caprolactam, aminoacetic acid, aminobenzoic acid, aminosuccinic acid, 2-aminopyridine, 2-amino-1-butanol, 2-aminoethanol, 1-amino-2-propanol, o-aminophenol, p-aminophenol, 6-amino-2-picoline, 2-amino-4-nitrophenol and mixtures thereof, and 50 to 100 parts by weight of water;
  (b) adding an acid catalyst selected from the group consisting of sodium hydrogen sulfate, sulfuric acid, hydrochloric acid, formic acid, acetic acid, phosphoric acid, acid alkyl phosphates and mixtures thereof, in the proportion of 1% to 10% by weight, weight based on the weight of hydrated silica and the amine compound;
  (c) heating said mixture to 80° to 150° C while agitating until most of the water is evaporated, replacing any evaporated amine, then heating is continued at 80° to 150° C for 30 to 60 minutes, thereby
  (d) producing an amine silicate compound.

17. The product, amine silicate compounds, as produced by the method of claim 16.
* * * * *